United States Patent
Choi et al.

(10) Patent No.: US 9,904,432 B2
(45) Date of Patent: Feb. 27, 2018

(54) TOUCH PANEL

(71) Applicant: LG INNOTEK CO., LTD., Seoul (KR)

(72) Inventors: Yongjae Choi, Seoul (KR); Young Sun You, Seoul (KR); Jong Woon Mun, Seoul (KR); Bong Jun Park, Seoul (KR); Seong Su Oem, Seoul (KR); Sun Hwa Lee, Seoul (KR); Kwang Yong Jin, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 126 days.

(21) Appl. No.: 14/735,620

(22) Filed: Jun. 10, 2015

(65) Prior Publication Data

US 2015/0370388 A1 Dec. 24, 2015

(30) Foreign Application Priority Data

Jun. 23, 2014 (KR) ........................ 10-2014-0076286

(51) Int. Cl.
*G06F 3/047* (2006.01)
*G06F 3/041* (2006.01)

(52) U.S. Cl.
CPC ............ *G06F 3/047* (2013.01); *G06F 3/0412* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2011/0062974 A1* | 3/2011 | Day | ........................ | G06F 3/044 324/713 |
| 2014/0049271 A1* | 2/2014 | Trend | ................. | G01R 27/2605 324/663 |
| 2014/0118641 A1* | 5/2014 | Ryu | ....................... | G06F 1/1692 349/12 |
| 2015/0002752 A1* | 1/2015 | Shepelev | ................ | G06F 3/044 349/12 |
| 2015/0248186 A1* | 9/2015 | Oh | ........................ | G06F 3/047 345/174 |

FOREIGN PATENT DOCUMENTS

KR 10-2014-0035726 A 3/2014

* cited by examiner

*Primary Examiner* — Jennifer Mehmood
*Assistant Examiner* — Krishna Neupane
(74) *Attorney, Agent, or Firm* — KED & Associates LLP

(57) ABSTRACT

A touch panel of the present disclosure includes a substrate divided into a view area and an unavailable area. Sensing electrodes are formed in the view area to sense a first input, and touch electrodes are formed in the view area not to be overlapped with the sensing electrodes to sense a second input. A first wire is formed in the unavailable area to connect first ends of the touch electrodes, and second wires are formed in the unavailable area and connected to the second ends of the touch electrodes. A controller is connected to the second wires to control the touch electrodes, in which the first wire may be connected to the plurality of touch electrodes, and the second wires may connect each of the plurality of touch electrodes to the controller.

7 Claims, 12 Drawing Sheets

TOUCH PANEL

CROSS-REFERENCE TO RELATED APPLICATION

This application claims priority under 35 U.S.C. § 119 to Korean Application No. 10-2014-0076286 filed on Jun. 23, 2014, whose entire disclosure is hereby incorporated by reference.

BACKGROUND

1. Field

The present disclosure relates to a touch panel.

2. Background

A touch panel is a device capable of controlling a device in combination with an LED, an LCD or the like by directly pressing a point where a sentence, a picture or the like is displayed. If a user presses a screen, a resistive touch panel determines an input by sensing changes of current and resistance generated when two sheets of transparent conductive film contact with each other. The input is made by touching the screen using a finger, a touch pen or the like, and a loop coil is arranged in the touch panel so that a touch is sensed by inductive power generated through the finger if the input is made by the finger and inductive current is generated by the electromagnetic force radiated from the touch pen if the input is made by the touch pen, and the electromagnetic force radiated from the loop coil is stored.

FIG. 1 is a plan view showing a touch panel according to an embodiment of the prior art. As shown in FIG. 1, a touch panel of the prior art includes both sensing electrodes 20 for a capacitive method and touch electrodes 30 for an electromagnetic induction method simultaneously formed on a substrate 10. However, such a structure of the prior art should construct a jumping structure 35 so that the touch electrodes 30 are electrically insulated from each other in forming the touch electrode 30. However, a touch panel of the jumping structure 35 for sensing an input in the capacitive method and the electromagnetic induction method has a problem in that the manufacturing process is complicated since the structure is complicated.

Furthermore, at least two or more touch electrodes 30 are included between adjacent sensing electrodes 20 in some cases so that each touch electrode 30 may form a loop structure, and a problem of short circuit of the touch electrodes 30 formed between the sensing electrodes 20 or a problem of disconnection of each touch electrode 30 occurs due to a processing error or the like in the process of forming each of the touch electrodes 30. Therefore, a problem of manufacturing throughput occurs.

In addition, a problem of increasing manufacturing time and cost also occurs. A problem of increasing the bezel size also occurs since the capacitive method and electromagnetic induction method are simultaneously used and the jumping structure is formed.

BRIEF DESCRIPTION OF THE DRAWINGS

The embodiments will be described in detail with reference to the following drawings in which like reference numerals refer to like elements wherein.

DESCRIPTION OF SYMBOLS

| | |
|---|---|
| 10: Substrate | 20: Sensing electrode |
| 30: Touch electrode | 35: Jumping structure |
| 100, 110, 210: Substrate | 150: Adhesive layer |
| 310: Control unit | 120: First sensing electrode |
| 121: Connection electrode | 130: First touch electrode |
| 131: First wire | 132: Second wire |
| 220: Second sensing electrode | 221: Connection electrode |
| 230: Second touch electrode | 231: First wire |
| 232: Second wire | |

DETAILED DESCRIPTION

Figure 2:
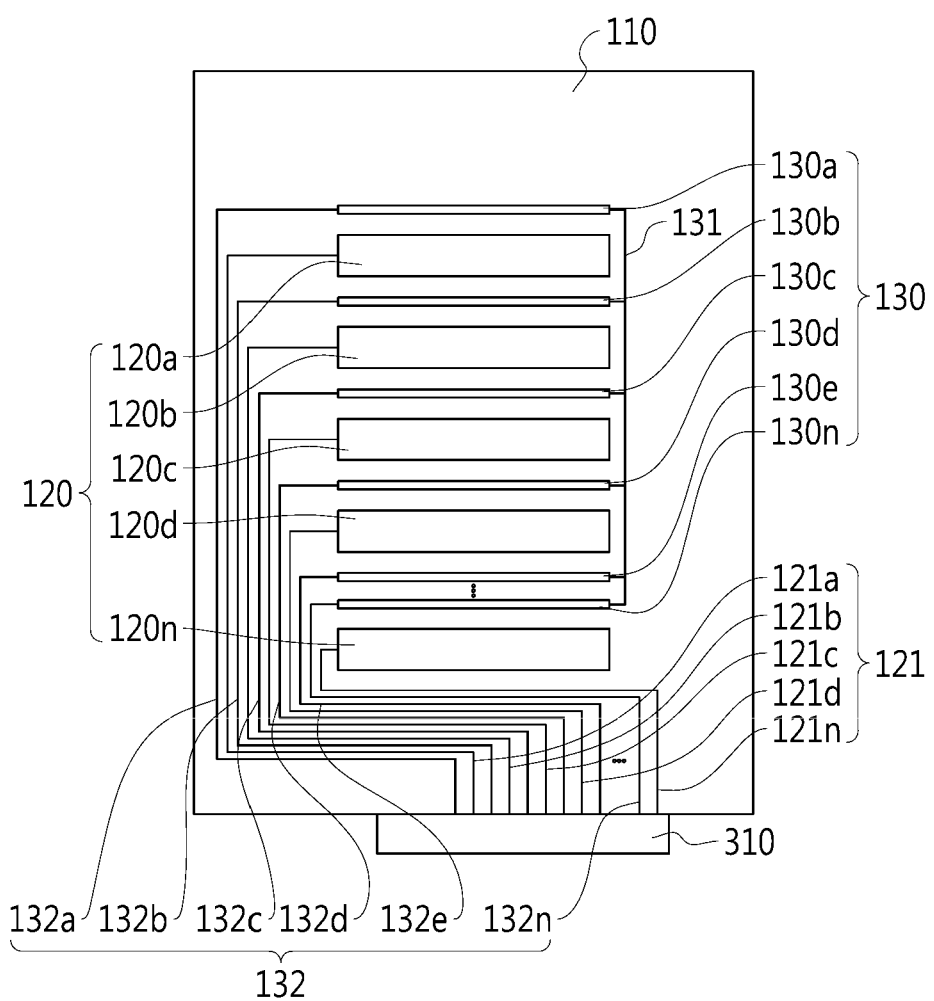
FIGS. 2 and 3 are plan views respectively showing a touch panel according to an embodiment of the present disclosure.

FIG. 2 is a plan view showing a touch panel according to an embodiment of the present disclosure. A touch panel includes a substrate 110 divided into a view or display area and an unavailable or non-display area, sensing electrodes 120 formed in the view area to sense a first input, touch electrodes 130 formed in the view area not to be overlapped with the sensing electrodes to sense a second input, a first wire 131 formed in the unavailable area to connect one ends of the touch electrodes, second wires 132 formed in the unavailable area and connected to the other ends of the touch electrodes, and a control unit 310 connected to the second wires to control the touch electrodes.

The touch panel includes the substrate 100 in which a view area (VA) for sensing a position of an input device (e.g., a finger or the like) and an unavailable area (UA) arranged around the view area (VA) are defined. A transparent electrode may be formed in the view area VA to sense an input device. In addition, a wire for electrically connecting the transparent electrode may be formed in the unavailable area UA. In addition, an external circuit or the like connected to the wire may be positioned in the unavailable area UA.

If an input device contacts with the touch panel, a difference of capacitance occurs at the point contacting with the input device, and the point generating such a difference is detected as a contact point. Such a touch panel is described below in further detail.

The substrate supports the sensing electrodes, an insulation layer, wiring electrodes, a circuit board and the like formed on the substrate. The substrate may be formed of various materials. For example, the substrate may be formed as a glass substrate or a plastic substrate.

The substrate includes a view area VA and an unavailable area UA surrounding the view area, and a printed layer may be formed in the unavailable area of the substrate. The printed layer may be formed by applying a material having a predetermined color so that the wiring electrode, the printed circuit board which connects the wiring electrode to the external circuit and the like may not be shown from outside. The printed layer may have a color appropriate to a desired appearance, and, for example, it may be shown in black or white by including a black or white pigment. In addition, a desired logo or the like can be formed on the printed layer in a variety of methods. The printed layer may be formed in the unavailable area UA of the substrate by using a black or white pigment. At this point, when a white pigment is used, a white layer is formed, and when a black pigment is used, a black layer may be formed. Here, the white pigment includes a transparent pigment.

The sensing electrode 120 may include a transparent conductive material so that electricity may flow without hindering transmission of light and is formed in the view area of the substrate. For example, the sensing electrode may include a metallic oxide such as indium tin oxide, indium zinc oxide, copper oxide, tin oxide, zinc oxide, titanium oxide or the like. Alternatively, the sensing electrode may include a nano wire, a photo sensitive nano wire film, a carbon nano tube CNT, a graphene or a conductive polymer. Alternatively, the sensing electrode may include various metals. For example, the sensing electrode may include at least one of metals including chrome Cr, copper Cu, aluminum Al, silver Ag, molybdenum Mo, gold Au, titanium Ti and an alloy of these. Furthermore, the sensing electrode may include a metal of superior electrical conductivity. The sensing electrode may sense a first input, and the first input includes, for example, an input generated by the capacitance changed by a finger. The sensing electrode may be connected to the control unit by a connection electrode 121 formed in the unavailable area.

The touch electrode 130 may also be implemented by a configuration of flowing electricity without hindering transmission of light and changing an electric field as a stylus pen approaches. It is formed in the view area of the substrate and may include, like the sensing electrode described above, a metallic oxide such as indium tin oxide, indium zinc oxide, copper oxide, tin oxide, zinc oxide, titanium oxide or the like. Alternatively, the touch electrode may include a nano wire, a photo sensitive nano wire film, a carbon nano tube CNT, a graphene or a conductive polymer. Alternatively, the touch electrode may include various metals. For example, the touch electrode may include at least one of metals including chrome Cr, copper Cu, aluminum Al, silver Ag, molybdenum Mo, gold Au, titanium Ti and an alloy of these. Furthermore, the touch electrode may include a metal of superior electrical conductivity. The touch electrode may sense a second input, and the second input includes, for example, an input generated as the electric field is changed by the stylus pen or the like.

The connection electrode 121 is a configuration formed in the unavailable area of the substrate and transmitting an electrical signal sensed by the sensing electrode to the control unit or the like of the touch panel. Meanwhile, the first and second wires are configurations formed in the unavailable area of the substrate and working as a medium for transmitting an electrical signal sensed by the touch electrode to the control unit or the like of the touch panel. The connection electrode and the wires may include a metal of superior electrical conductivity.

For example, the connection electrode and the wires may include a metallic oxide such as indium tin oxide, indium zinc oxide, copper oxide, tin oxide, zinc oxide, titanium oxide or the like or may include a nano wire, a photo sensitive nano wire film, a carbon nano tube CNT, a graphene or a conductive polymer. Furthermore, the connection electrode and the wires may include various metals. For example, the connection electrode and the wires may include at least one of metals including chrome Cr, copper Cu, aluminum Al, silver Ag, molybdenum Mo, gold Au, titanium Ti and an alloy of these.

Figure 4:
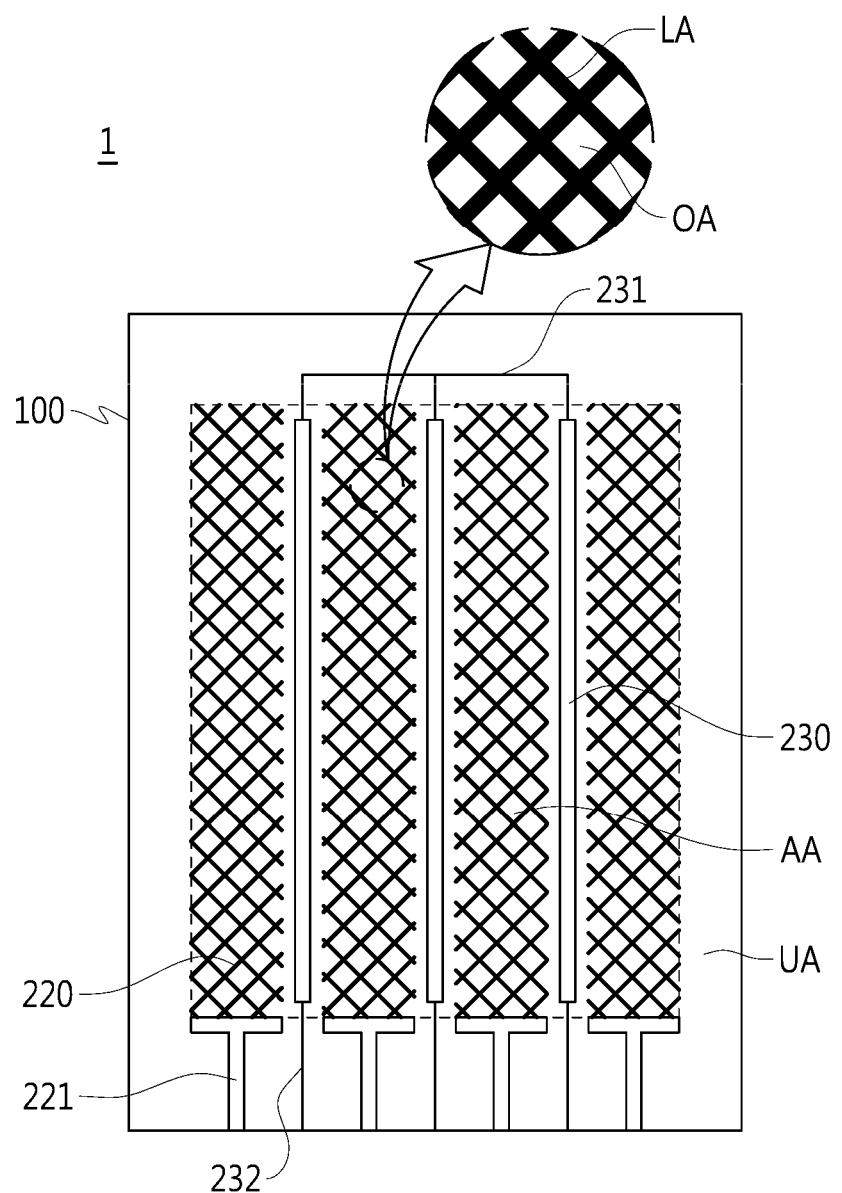
FIG. 4 is a plan view showing a mesh structure of electrodes formed on a touch panel according to an embodiment of the present disclosure.

The sensing electrode, the touch electrode and the first and second wires may be formed in the shape of a mesh. Specifically, the sensing electrode, the touch electrode and the first and second wires may include a plurality of sub-electrodes respectively, and the sub-electrodes may be arranged to cross each other in the shape of a mesh. That is, the sensing electrode may include mesh lines LA and mesh openings OA formed between the mesh lines LA by the plurality of sub-electrodes crossing each other in the shape of a mesh. This can be observed with reference to FIG. 4.

The line width of the mesh line LA may be approximately 0.1 to 10 μm. A mesh line unit having a line width smaller than approximately 0.1 μm may not be allowed in the manufacturing process, or a short circuit of the mesh line may occur, and if the line width exceeds 10 μm, the electrode pattern is visible from outside, and thus visibility may be lowered. The line width of the mesh line LA may be approximately 0.5 to 7 μm. The line width of the mesh line may be approximately 1 to 3.5 μm.

In addition, the mesh openings may be formed in a variety of shapes. For example, the mesh openings OA may have a variety of shapes such as a polygonal shape, such as a rectangular shape, a diamond shape, a pentagonal shape or a hexagonal shape, a circular shape and the like. In addition, the mesh openings may be formed in a regular shape or a random shape.

Since the sensing electrode and the touch electrode have a mesh shape, a pattern of the sensing electrode may be invisible in the view area, for example, in a display area. Although the sensing electrode is formed of a metal, it is possible to make the pattern non-visible to a user. In addition, although the sensing electrode is applied to a touch panel of a large size, resistance of the touch panel may be lowered.

In an embodiment of the present disclosure, an electrode of a mesh shape can be formed by arranging a metallic layer on the front surface of the substrate and etching the metallic layer in a mesh shape. For example, after depositing a metal such as copper Cu on the front surface of a substrate such as polyethylene terephthalate or the like, a copper mesh electrode of an embossed mesh shape may be formed on the front surface by etching the copper layer.

Alternatively, after forming a resin layer (or an intermediate layer) including photocurable resin (UV resin) or thermosetting resin on the substrate and then forming an intaglio pattern of a mesh shape on the resin layer, a conductive material may be filled in the intaglio pattern. At this point, the intaglio pattern of the resin layer may be formed by imprinting a mold having an embossed pattern. The conductive material may be a metallic paste including at least one of metals including Cr, Ni, Cu, Al, Ag, Mo and an alloy of these. Accordingly, a metallic mesh electrode of an intaglio mesh shape can be formed by filling and curing or coating the metallic paste in the intaglio pattern of a mesh shape.

In another embodiment, after forming a resin layer (or an intermediate layer) including photocurable resin (UV resin) or thermosetting resin on the substrate and then forming an embossed or intaglio nano and micro patterns of a mesh shape on the resin layer, at least one of metals including Cr, Ni, Cu, Al, Ag, Mo and an alloy of these may be deposited on the resin layer through a sputtering process or the like. The embossed pattern of the nano pattern and the micro pattern may be formed by imprinting a mold having an intaglio pattern, and the intaglio pattern may be formed by imprinting a mold having an embossed pattern.

Subsequently, a metallic electrode of a mesh shape may be formed by removing only the metallic layer formed on the nano pattern and remaining only the metallic layer formed on the micro pattern by etching the metallic layer formed on the nano pattern and the micro pattern. At this point, a difference in the etching speed may occur according to the difference in the contacting areas between the nano and micro patterns and the metallic layer when the metallic layer is etched.

Since the contacting area between the micro pattern and the metallic layer is larger than the contacting area between the nano pattern and the metallic layer, the electrode material formed on the micro pattern is less etched, and as the metallic layer formed on the micro pattern remains and the metallic layer formed on the nano pattern is etched and removed according to the same etching speed, a metallic electrode of an embossed or intaglio mesh shape of the micro pattern may be formed on the substrate.

The control unit 310 is a configuration for receiving and processing electrical signals generated by the sensing electrode and the touch electrode according to a touch input and controlling to sense a second input by supplying power to the touch electrode. It can be implemented by a driver IC or the like. A single control unit may control the sensing electrode and the touch electrode and process input signals the electrodes, or a control unit for driving and controlling the sensing electrode and a control unit for controlling the touch electrode may be separately included.

In the present disclosure, as shown in FIG. 2, one ends of a plurality of touch electrodes 130 are connected by the first wire 131, and the other ends of the plurality of touch electrodes are connected to the control unit by the second wires 132a to 132n. The sensing electrodes for sensing an input in a capacitive method are formed in a first direction, and the touch electrodes are also formed in the first direction not to be overlapped with the sensing electrodes. On the other hand, the sensing electrodes may be formed in a second direction, and the touch electrodes may also be formed in the second direction not to be overlapped with the sensing electrodes formed in the second direction.

The sensing electrodes and the touch electrodes formed in the first direction and the sensing electrodes and the touch electrodes formed in the second direction may be formed on different sides of a substrate or on different substrates. When they are formed on a substrate, the sensing electrodes and the touch electrodes formed in the first direction may be included on one side of the substrate, and the sensing electrodes and the touch electrodes formed in the second direction may be included on the other side of the substrate.

Figure 3:
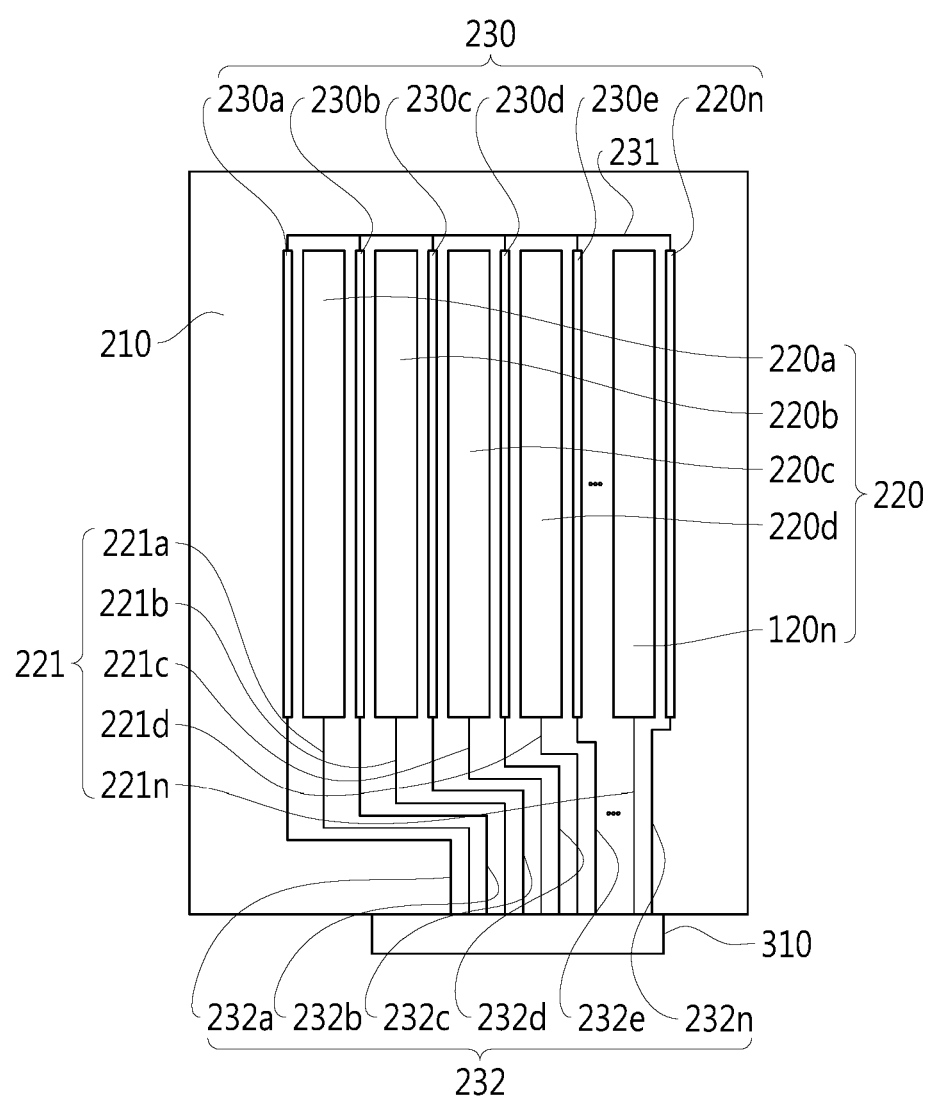

Alternatively, the substrate may include a first substrate and a second substrate, and the first substrate may include first sensing electrodes formed in the view area in the first direction to sense a first input and first touch electrodes formed in the view area in the first direction not to be overlapped with the first sensing electrodes to sense a second input, and the second substrate 210 may include second sensing electrodes 220 formed in the view area in the second direction to sense a first input and second touch electrodes 230 formed in the view area in the second direction not to be overlapped with the second sensing electrodes to sense a second input. In this case, any one of the first substrate and the second substrate can be a cover substrate. FIG. 2 shows the first substrate including the sensing electrodes and the touch electrodes formed in the first direction, and FIG. 3 shows the second substrate including the sensing electrodes and the touch electrodes formed in the second direction.

Furthermore, it may also be applied to a structure of forming a first touch electrode and a second touch electrode on one substrate and sensing an input for a touch in a pen touch input method of an electromagnetic induction method. If a touch panel can be applied to a configuration of connecting one ends of electrodes using one line so as not to have a jumping structure and forming a control unit to control drive of each electrode, it is not limited by the structure of the touch panel. This can be equally applied to the embodiment described hereinafter.

Figure 6:
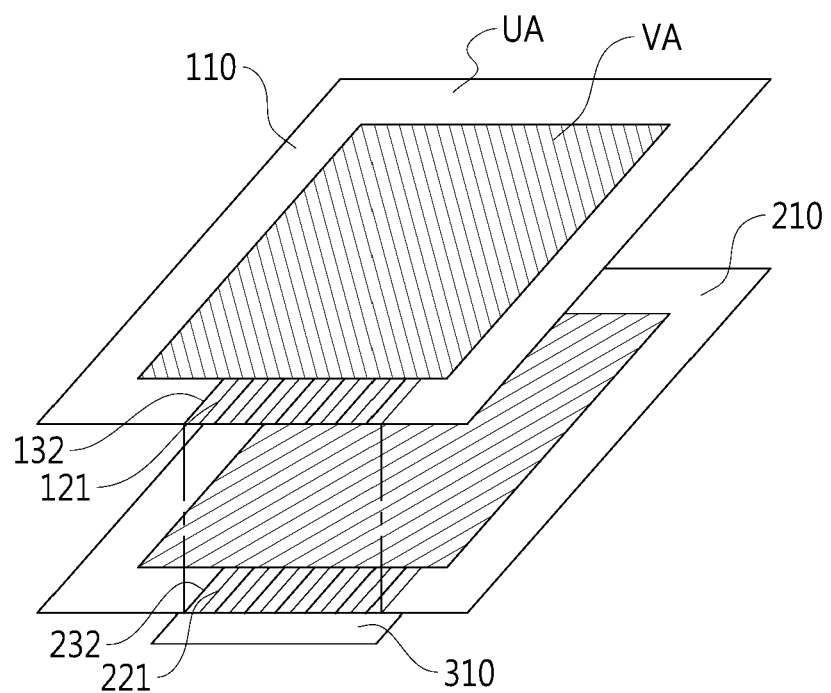
FIG. 6 is a perspective view schematically showing a touch panel according to an embodiment of the present disclosure.
Figure 7:
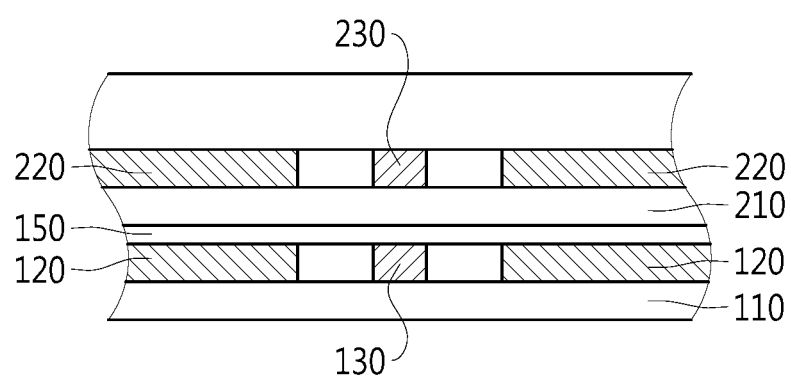
FIG. 7 is a cross-sectional view showing a touch panel according to an embodiment of the present disclosure.

In an embodiment of the present disclosure, a surface of the second substrate on which the second sensing electrodes and the second touch electrodes are not formed and a surface of the first substrate on which the first sensing electrodes and the first touch electrodes are formed may bond to each other. The first substrate and the second substrate may be connected to each other by an adhesive layer 150 or the like. For example, they may adhere to each other through an optical clear adhesive OCA or an optical clear resin OCR. This can be confirmed through FIGS. 6 and 7.

The control unit may sense a second input by selectively supplying power to a plurality of touch electrodes. In an embodiment, when a stylus pen includes a power source inside thereof, a touch electrode senses that the stylus pen generating inductive current by the internal power and a coil structure approaches and contacts with the touch panel, and the control unit selectively supplies power to the touch electrodes. A loop formed by the touch electrodes supplied with power and the first and second wires senses inductive current generated by the stylus pen and grasps a position of sensing an input generated by the stylus pen through the induced current. In this embodiment, power is supplied to a touch electrode among a plurality of touch electrodes and power is supplied from another touch electrode to form a loop, and a position of the pen can be sensed through the loop.

In another embodiment, the control unit forms a loop by using two previously determined touch electrodes among a plurality of touch electrodes. More specifically, power is selectively supplied to flow current into one touch electrode and to flow the current back into the control unit from the other touch electrode. The two touch electrodes, a first wire connecting the touch electrodes, a second wire connecting each of the touch electrodes to the control unit, and the control unit form a loop. When a stylus pen is positioned at the position where the loop is formed, an induced electromotive force is generated at the loop inside the stylus pen, and when the induced electromotive force is generated inside the stylus pen, the control unit does not stop the power supplied to the touch electrode configuring the corresponding loop. In addition, the control unit senses and grasps the position by sensing again the induced electromotive force generated by the stylus pen.

In the embodiments described above, the control unit selectively supplies power to the touch electrodes in order to use any one of the touch electrodes for forming a loop as a path for flowing current from the control unit and the other touch electrode as a path for flowing the current back into the control unit. Accordingly, the selected touch electrodes, the second wires for connecting the other ends of the touch electrodes to the control unit, the first wire for connecting one ends of the touch electrodes, and the control unit form a loop, and the loop may sense a second input position by sensing generation/change of an electric field according to the second input of the stylus pen or the like. If the touch electrodes respectively formed in the first and second directions operate as described above, a position on a two-dimensional plane can be sensed.

In the present disclosure, since the first wire 131 formed at one ends of touch electrodes is connected to a plurality of touch electrodes 130a to 130n and the control unit sequentially forms a loop by selectively supplying power to the touch electrodes, multiple loops do not need to be formed as is in the prior art, and a jumping structure of wires inevitably created in forming the multiple loops may not be formed. Accordingly, since various processes needed for forming the jumping structure can be omitted, the manufacturing process can be simplified, and the manufacturing throughput can be enhanced.

On the other hand, at least three or more touch electrodes may be connected to the first wire of the present disclosure. In addition, a second input may be sensed by selectively supplying power to the three or more touch electrodes.

Figure 5:
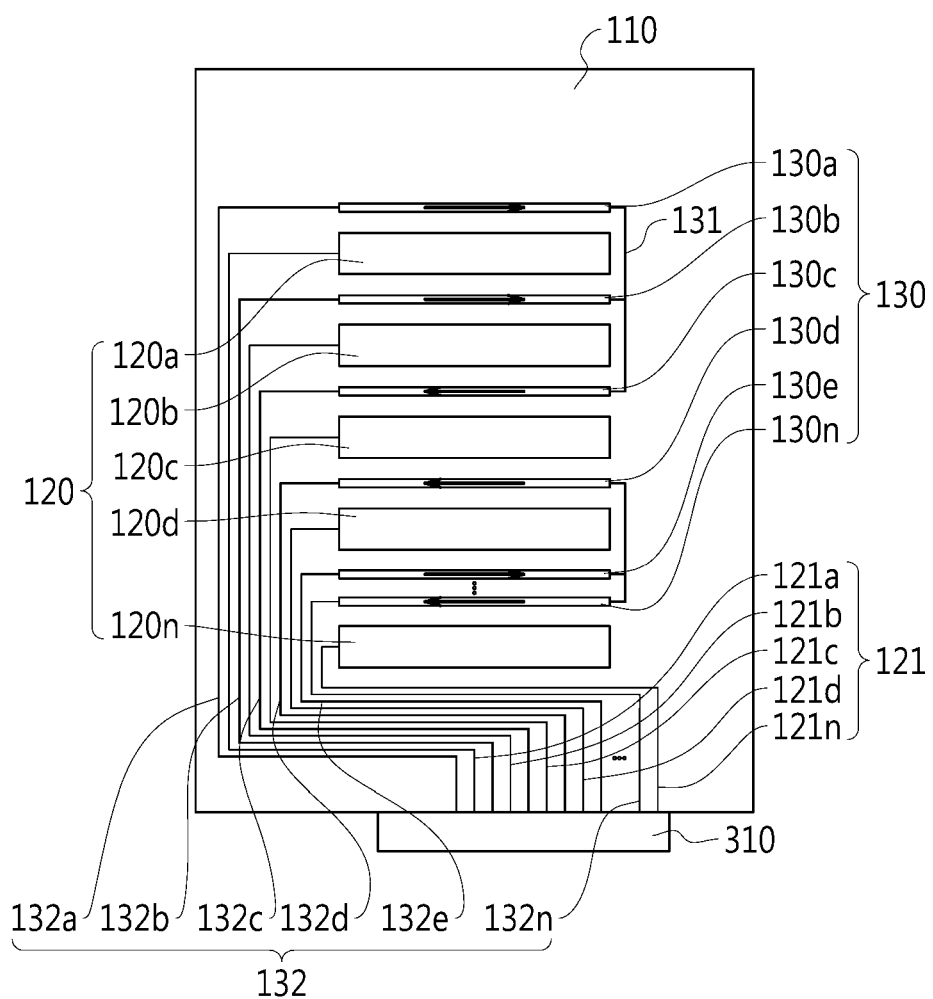
FIG. 5 is a plan view showing a touch panel according to another embodiment of the present disclosure.

In another embodiment of the present disclosure, the first wire may be formed in the unavailable area in plurality. This embodiment is described with reference to FIG. 5. Referring to FIG. 5, two of the first wire connecting one ends of touch electrodes are formed. However, the two first wires are only for example, and further more wires may be included.

At least any one of the first wires may connect one ends of a plurality of, preferably three or more, touch electrodes. Accordingly, if the control unit selectively supplies power and activates the touch electrodes connected to the first wire, the first wire, the touch electrodes supplied with power, second wires respectively connected to the other ends of the touch electrodes and the control unit form a loop, and a second input may be sensed through the loop.

All the first wires formed in plurality do not need to be connected to three or more touch electrodes, and some of the wires may be connected to two touch electrodes. At this point, the first wire connected to the two touch electrodes forms only one loop together with the two touch electrodes and does not selectively form a loop together with the other touch electrodes.

A touch panel according to another embodiment of the present disclosure includes a substrate divided into a view area and an unavailable area, sensing electrodes formed in the view area to sense a first input, touch electrodes formed in the view area not to be overlapped with the sensing electrodes to sense a second input, a first wire formed in the unavailable area to connect one ends of the touch electrodes, second wires formed in the unavailable area and connected to the other ends of the touch electrodes, and a control unit connected to the second wires to control the touch electrodes, and the control unit selectively supplies power to the plurality of touch electrodes, and the touch electrodes supplied with power, the first wire connecting the one ends of the touch electrodes, second wires connecting the other ends of the touch electrodes supplied with power to the control unit, and the control unit may form a loop.

This embodiment is described with reference to FIGS. 2 and 3. In this embodiment, first to n-th loops are formed by the first wire, the touch electrodes, the second wires and the control unit, and at this point, the first wire is included in all the first to n-th loops formed including a plurality of touch electrodes selectively supplied with power from the control unit and processes signals generated through the first to n-th loops and current flowing into and out of the loops. Contrarily, only a second wire connected to a loop formed when a touch electrode connected to the second wire is supplied with power from the control unit, i.e., any one of the first to n-th loops, processes signals and current of a corresponding loop. In the example of FIG. 2, if 130a and 130c among the touch electrodes receive power and form a loop, 132a and 132c among the second wires are included in the loop. At this point, the first wire is included in the loop. If 130b and 130c among the touch electrodes receive power and form a loop, although 132b and 132c among the second wires are included in the loop, the first wire is included in the loop.

Also in this embodiment, since at least three or more touch electrodes are connected to any one of the first wires and the control unit selectively supplies power to the touch electrodes, a second input may be sensed by controlling the touch electrodes without a jumping structure.

A touch panel according to another embodiment of the present disclosure includes a substrate divided into a view area and an unavailable area, sensing electrodes formed in the view area to sense a first input, touch electrodes formed in the view area not to be overlapped with the sensing electrodes to sense a second input, a first wire formed in the unavailable area to connect one ends of the touch electrodes, second wires formed in the unavailable area and connected to the other ends of the touch electrodes, and a control unit connected to the second wires to control the touch electrodes, and a width of a touch electrode formed between adjacent sensing electrodes may be formed to be wider than the width of the first wire and narrower than the width between the adjacent sensing electrodes. In addition, the width of the touch electrode formed between the adjacent sensing electrodes is wider than the width of a touch electrode formed outside the sensing electrodes.

Figure 8:
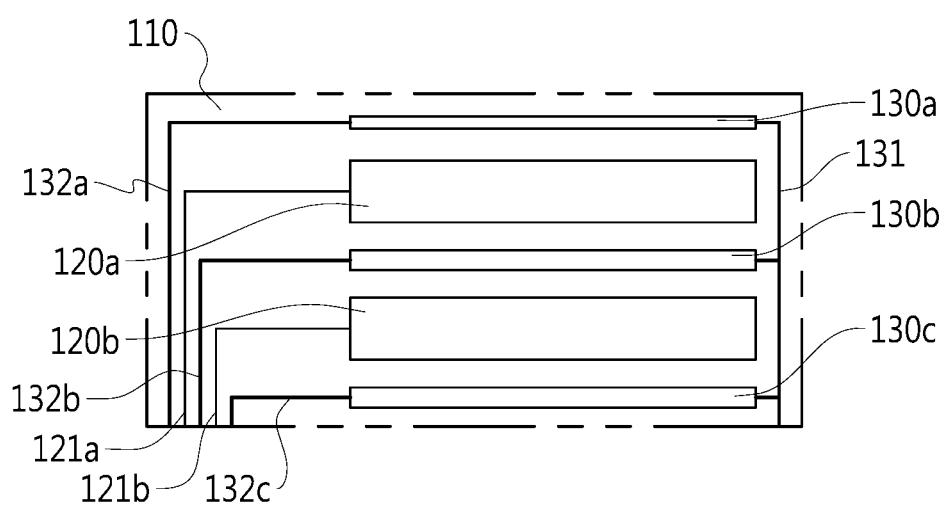
FIG. 8 is a plan view showing a partially exploded touch panel according to an embodiment of the present disclosure.

This embodiment is described with reference to FIG. 8. In this embodiment, a first wire and a second wire are formed at one end and the other end of a touch electrode, and a plurality of touch electrodes are connected by the first wire of the one end, and each of the touch electrodes may be connected to the control unit by the second wire of the other end. Therefore, the control unit may independently and selectively control each of the touch electrodes by the second wire connected to the other end of the touch electrode, and a loop is selectively formed among a plurality of independently and selectively controlled touch electrodes by the first wire connecting one ends of the touch electrodes together.

Particularly, the first wire connected to one ends of two touch electrodes selectively supplied with power from the control unit among the plurality of touch electrodes, two second wires connected between the control unit and the other ends of the touch electrodes selectively supplied with power, and the control unit electrically form a loop, and the control unit may receive signals sensed by the touch electrodes through this loop. Accordingly, a pen touch input may be sensed through the touch electrodes in a loop shape although a jumping structure is not formed. The control unit may independently control the touch electrodes, the first wire and the second wires and may determine, randomly or as needed, an order of supplying the power to the touch electrodes used for the pen touch input.

In this embodiment, the touch electrodes 130b and 130c formed between sensing electrodes may have a width wider than the width of the touch electrode 130a formed outside the sensing electrodes, i.e., outside a sensing electrode formed outermost. The touch electrodes 130b and 130c formed between adjacent sensing electrodes may have a width wider than that of the prior art. As the width of a touch electrode increases, a risk of short circuit of the touch electrode decreases, and this will eventually bring an effect of increasing the throughput of a product and extending the lifespan of the product.

Specifically, a touch electrode formed between adjacent sensing electrodes may be formed to have a width of 0.5 to 3 mm. It may be formed to have a width of 1 to 2.5 mm, and when the touch electrode is formed to have a width of 1.2 to 2 mm, performance of sensing the second input can be improved, and its throughput and lifespan can be extended. If the width of the touch electrode is smaller than 0.5 mm, it is almost the same as the width of a touch electrode, and thus the touch electrode may be short-circuited in the process of forming the touch electrode or in the process fabricating a touch panel performed thereafter. If the width of the touch electrode exceeds 3 mm, the width between the sensing electrodes is widened as much or the space formed between the sensing electrodes and the touch electrode is reduced, and thus a chance of occurring a milky phenomenon dimly showing the touch panel is high. This will eventually deteriorate visibility of the touch panel.

On the other hand, in an embodiment of the present disclosure, one touch electrode may be formed between adjacent sensing electrodes. This embodiment relates to the structure of a touch electrode formed between sensing electrodes.

Figure 1:
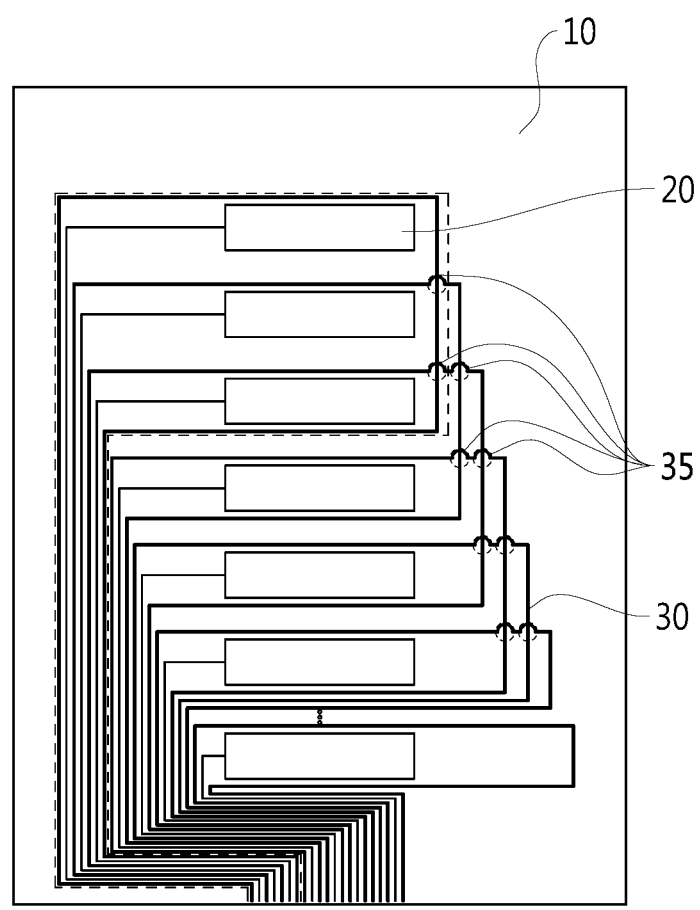
FIG. 1 is a plan view showing a touch panel according to an embodiment of the prior art.

In the prior art shown in FIG. 1, two touch electrodes and a control unit form independent loops in order to sense a signal using the touch electrodes, and pen sensing is allowed in all areas by densely arranging the loops. At least two touch electrodes need to be arranged between adjacent sensing electrodes in order to grasp an accurate sensing position. However, in this case, the problems may occur.

In the present disclosure, it is possible to sense a signal by connecting one ends of a plurality of touch electrodes using a wire and forming an electrical loop without a jumping structure under the control of the control unit. Accordingly, one touch electrode may be formed between adjacent sensing electrodes.

Even in the structure described above, the control unit may form a loop for sensing a second input by selectively supplying power to a plurality of touch electrodes, and to this end, at least three or more touch electrodes may be connected to the first wire.

FIGS. 9 to 12 are views showing examples of applying a touch panel according to various embodiments of the present disclosure.

Figure 9:
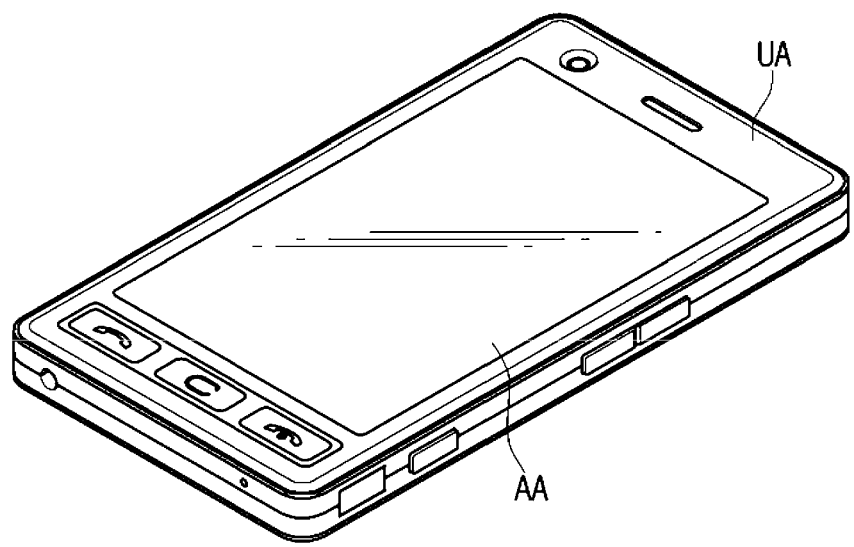
FIGS. 9 to 12 are views showing examples of applying a touch panel according to various embodiments of the present disclosure.

FIG. 9 is a view showing a touch panel of the present disclosure applied to a mobile device. The touch panel described above can be applied to a display unit of a mobile device. The mobile device may include a view area AA and an unavailable area UA. The view area AA senses a touch signal generated by a touch of a finger or the like, and a command icon pattern unit, a log and the like may be formed in the unavailable area.

Figure 10:
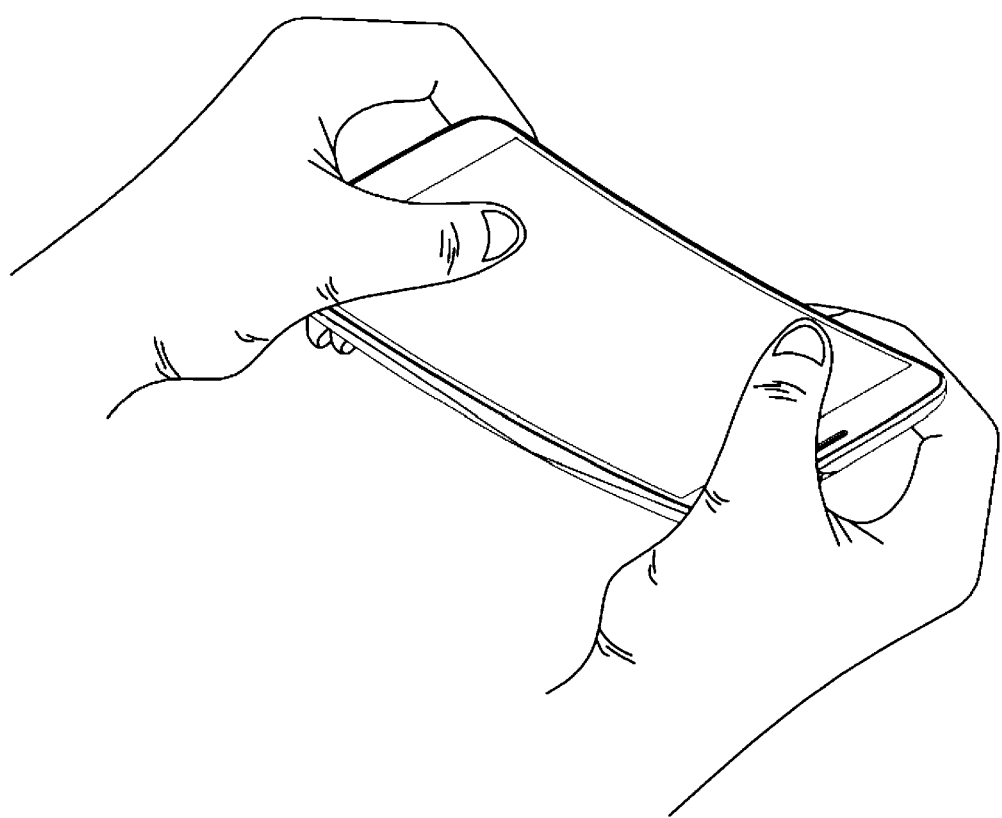

FIG. 10 is a view showing a mobile device having a curved display among mobile devices. This embodiment applies a touch panel of a substrate bended while having partially curved surfaces. For example, a touch panel may have a substrate of a form bended while having a flat surface in some areas and a curved surface in the other areas. Specifically, the ends of a substrate may be bended while having a curved surface or may be bended or curved while having a surface including a random curvature. Alternatively, the substrate itself may be a flexible substrate having a flexible characteristic. Other than these, the substrate may be a curved or bended substrate. That is, a touch panel including the substrate may also be formed to have a flexible, curved or bended characteristic. According to this, a mobile device applying a touch panel according to this embodiment is easy to carry and may be modified into a variety of designs.

Figure 11:
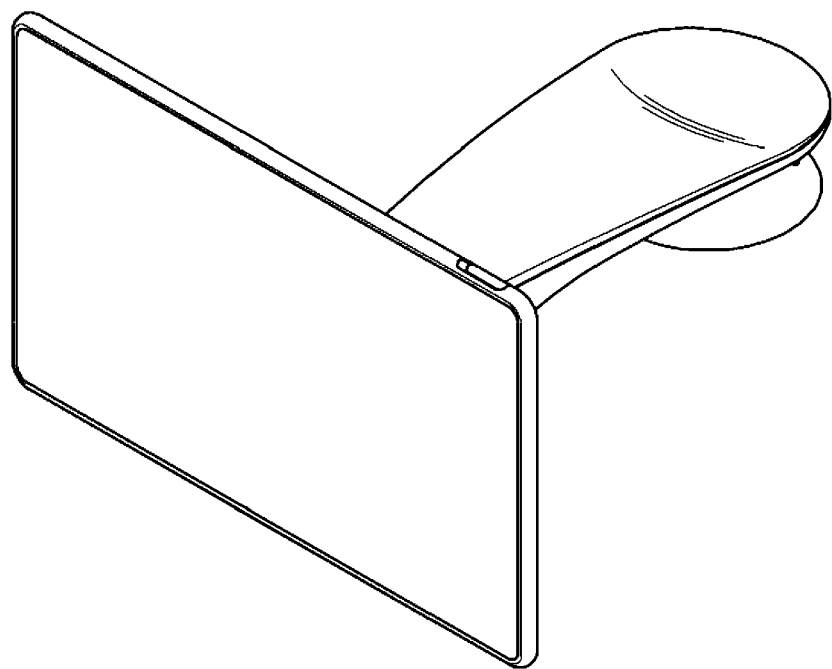

FIG. 11 is a view showing a touch panel according to an embodiment of the present disclosure, which is formed to be attached to and detached from other devices through a connection means. For example, the touch panel of the present disclosure may be applied to a navigation device for a vehicle and used to be attached to and detached from the vehicle.

Figure 12:
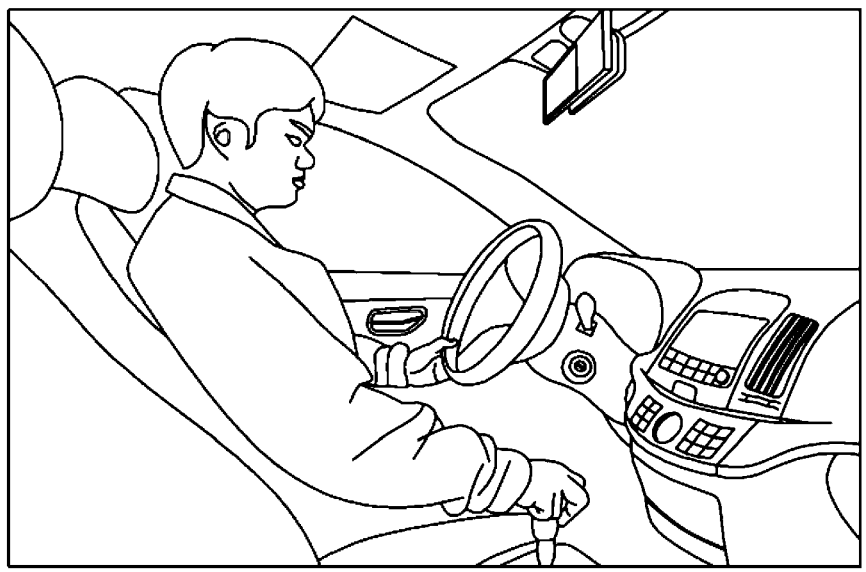

FIG. 12 is a view showing an example of implementing a display for a vehicle through a touch panel according to an embodiment of the present disclosure. It may be applied to a variety of parts in the vehicle to which the panel can be applied. A Center Information Display (CID), as well as a Personal Navigation Display (PND), can be implemented by applying the touch panel to a dashboard or the like. However, it is apparent that the embodiment is not limited to this, but such a touch device may be used in a variety of electronic products.

The present disclosure is effective in that a touch panel simultaneously using a capacitive touch input method and an electromagnetic touch input method can be implemented.

In addition, the present disclosure is effective in that in forming a touch panel simultaneously using a capacitive touch input method and an electromagnetic touch input method, the manufacturing process is simple, manufacturing time can be reduced, and manufacturing cost can be lowered.

In addition, the present disclosure is effective in that in a touch panel implementing an electromagnetic touch input method, the area of a bezel can be reduced while implementing a touch panel simultaneously using a capacitive touch input method and an electromagnetic touch input method.

According to one aspect of the present disclosure, there is provided a touch panel implementing multiple input methods, the touch panel including: a substrate divided into a view area and an unavailable area; sensing electrodes formed in the view area to sense a first input; touch electrodes formed in the view area not to be overlapped with the sensing electrodes to sense a second input; a first wire formed in the unavailable area to connect one ends of the touch electrodes; second wires formed in the unavailable area and connected to the other ends of the touch electrodes; and a control unit connected to the second wires to control the touch electrodes, in which the first wire is connected to the plurality of touch electrodes, and the second wires connect each of the plurality of touch electrodes to the control unit. At this point, the control unit may selectively supply power to the plurality of touch electrodes. Meanwhile, at least three or more touch electrodes may be connected to the first wire, and the first wire may be formed in the unavailable area in plurality.

In an embodiment of the present disclosure, the substrate may include a first substrate and a second substrate, in which the first substrate may include first sensing electrodes formed in the view area in a first direction to sense a first input; and first touch electrodes formed in the view area in the first direction not to be overlapped with the first sensing electrodes to sense a second input; and the second substrate may include second sensing electrodes formed in the view area in a second direction to sense the first input; and second touch electrodes formed in the view area in the second direction not to be overlapped with the second sensing electrodes to sense the second input. At this point, a surface of the second substrate on which the second sensing electrodes and the second touch electrodes are not formed and a surface of the first substrate on which the first sensing electrodes and the first touch electrodes are formed may bond to each other. Meanwhile, at least one of the sensing electrodes, the touch electrodes, the first wire, and the second wires is able to be formed in a mesh shape and a line width of the mesh shape may be 0.1 to 10 μm, and the touch electrodes are formed in a mesh shape.

A touch panel according to another embodiment of the present disclosure includes a substrate divided into a view area and an unavailable area; sensing electrodes formed in the view area to sense a first input; touch electrodes formed in the view area not to be overlapped with the sensing electrodes to sense a second input; a first wire formed in the unavailable area to connect one ends of the touch electrodes; second wires formed in the unavailable area and connected to the other ends of the touch electrodes; and a control unit connected to the second wires to control the touch electrodes, in which the control unit may selectively supply power to the plurality of touch electrodes, and the touch electrodes supplied with power, the first wire connecting one ends of the touch electrodes, second wires connecting the other ends of the touch electrodes supplied with power to the control unit, and the control unit may form a loop. At this point, at least three or more touch electrodes may be connected to at least any one of first wires. And, at least one of the sensing electrodes, the touch electrodes, the first wire, and the second wires is formed in a mesh shape.

Meanwhile, in the embodiment described above, the first wire may transmit signals of first to n-th loops formed by the plurality of touch electrodes selectively supplied with power, and the second wire may transmit a signal of a loop created when a touch electrode connected to the second wire is supplied with power.

A touch panel according to another embodiment of the present disclosure includes a substrate divided into a view area and an unavailable area; sensing electrodes formed in the view area to sense a first input; touch electrodes formed in the view area not to be overlapped with the sensing electrodes to sense a second input; a first wire formed in the unavailable area to connect one ends of the touch electrodes; second wires formed in the unavailable area and connected to the other ends of the touch electrodes; and a control unit connected to the second wires to control the touch electrodes, in which a width of a touch electrode formed between adjacent sensing electrodes may be wider than a width of the first wire and narrower than a width between the adjacent sensing electrodes. At this point, one touch electrode may be formed between the adjacent sensing electrodes. The width of the touch electrode formed between the adjacent sensing electrodes may be formed to be wider than a width of a touch electrode formed outside the sensing electrodes. In this embodiment, the control unit may selectively supply power to the plurality of touch electrodes, and at least three or more touch electrodes may be connected to the first wire. And, at least one of the sensing electrodes, the touch electrodes, the first wire, and the second wires is formed in a mesh shape.

In describing the embodiments, the meaning of forming a layer (film), an area, a pattern or a structure "on" or "under" a substrate, a layer (film), an area, a pad or a pattern includes forming directly on the substrate, the layer (film), the area, the pad or the pattern or forming with intervention of another layer. A reference of on or under of each layer is described based on the drawings.

In addition, when an element is connected to another element, it includes a case of indirectly connecting the elements with intervention of another element therebetween, as well as a case of directly connecting the elements. In addition, the concept of including a constitutional element means further including another constitutional element, not excluding another constitutional element, as far as an opposed description is not specially specified.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a substrate divided into a view area and a non-view area;
an intermediate layer on the substrate that includes photocurable ultraviolet resin, wherein the intermediate layer includes an intaglio pattern of a mesh shape, wherein a conductive material is provided in the intaglio pattern;
sensing electrodes formed on the intermediate layer and in the view area to sense a first input, wherein the sensing electrodes include a plurality of sub-electrodes and the sub-electrodes form a mesh pattern;
touch electrodes formed on the intermediate layer and in the view area, not to be overlapped with the sensing electrodes, to sense a second input, wherein the touch electrodes include a plurality of sub-electrodes and the sub-electrodes form a mesh pattern, wherein the touch electrodes are provided in a numeric order from a first touch electrode formed outside the sensing electrodes to an Nth touch electrode, and wherein a width of one of the touch electrodes formed between two adjacent sensing electrodes is wider than a width of the first touch electrode formed outside the sensing electrodes, and wherein only one touch electrode is disposed between each two adjacent sensing electrodes, and first ends of all the touch electrodes are connected to a first wire;
wherein the sensing electrodes and the touch electrodes include mesh lines (LA) and mesh openings (OA) formed between the mesh lines (LA) by the plurality of sub-electrodes, and a line width of the mesh line (LA) is 0.1 to 10 μm;
the first wire formed in the non-view area to connect the first ends of the touch electrodes;

second wires formed in the non-view area and connected to second ends of the touch electrodes; and a controller connected to the second wires to control the touch electrodes, wherein the first wire is connected to the touch electrodes, and the second wires connect the touch electrodes to the controller, wherein the controller selectively supplies power to the touch electrodes in order to use any one of the touch electrodes for forming a loop as a path for flowing current from the controller and the other touch electrode as a path for flowing the current back into the controller, wherein upon the touch electrodes receiving power, the first wire, the second wires, and the controller form a loop, wherein the controller sequentially forms a loop by selectively supplying power to the touch electrodes.

2. The touch panel according to claim 1, wherein the first wire is formed in the non-view area in plurality.

3. The touch panel according to claim 1, wherein the substrate includes a first substrate and a second substrate, the sensing electrodes comprises first and second sensing electrodes, and the touch electrodes comprises first and second touching electrodes, wherein a first surface of the first substrate includes the first sensing electrodes formed in the view area in a first direction to sense the first input, and the first touch electrodes formed in the view area in the first direction to sense the second input, the first sensing electrodes and the first touch electrodes being non-overlapping; and a first surface of the second substrate includes the second sensing electrodes formed in the view area in a second direction to sense the first input, and the second touch electrodes formed in the view area in the second direction to sense the second input the second sensing electrodes and the second touch electrodes being non-overlapping.

4. The touch panel according to claim 3, wherein an adhesive layer is provided between a second surface of the second substrate on which the second sensing electrodes and the second touch electrodes are not formed and the first surface of the first substrate, wherein a first surface of the adhesive layer is bonded to the second surface of the second substrate, and a second surface of the adhesive layer is bonded to the first surface of the first substrate.

5. The touch panel according to claim 1, wherein the at least one first wire transmits signals of first to n-th loops formed by the touch electrodes selectively supplied with power.

6. The touch panel according to claim 1, wherein a corresponding second wire transmits a signal of a loop created when a corresponding touch electrode connected to the corresponding second wire is supplied with power.

7. A touch panel comprising:

a substrate divided into a view area and an unavailable area;

an intermediate layer on the substrate that includes photocurable ultraviolet resin, wherein the intermediate layer includes an intaglio pattern of a mesh shape, wherein a conductive material is provided in the intaglio pattern;

sensing electrodes formed on the intermediate layer and in the view area to sense a first input, wherein the sensing electrodes include a plurality of sub-electrodes and the sub-electrodes form a mesh pattern;

touch electrodes formed on the intermediate layer and in the view area, not to be overlapped with the sensing electrodes, to sense a second input, wherein the touch electrodes include a plurality of sub-electrodes and the sub-electrodes form a mesh pattern, wherein the touch electrodes are provided in a numeric order from a first touch electrode formed outside the sensing electrodes to an Nth touch electrode, and wherein a width of one of the touch electrodes formed between two adjacent sensing electrodes is wider than a width of the first touch electrode formed outside the sensing electrodes, and wherein only one touch electrode is disposed between each two adjacent sensing electrodes, and first ends of all the touch electrodes are connected to a first wire;

wherein the sensing electrodes and the touch electrodes include mesh lines (LA) and mesh openings (OA) formed between the mesh lines (LA) by the plurality of sub-electrodes, and a line width of the mesh line (LA) is 0.1 to 10 μm;

the first wire formed in the unavailable area to connect the first ends of the touch electrodes;

second wires formed in the unavailable area and connected to the second ends of the touch electrodes; and a controller connected to the second wires to control the touch electrodes, wherein a width of a touch electrode formed between adjacent sensing electrodes is wider than a width of the first wire and narrower than a width of the adjacent sensing electrodes, wherein the controller selectively supplies power to the touch electrodes in order to use any one of the touch electrodes for forming a loop as a path for flowing current from the controller and the other touch electrode as a path for flowing the current back into the controller, wherein the controller sequentially forms a loop by selectively supplying power to the touch electrode.

* * * * *